April 28, 1925.
E. KELLEY
1,536,018
ADJUSTABLE BUSHING
Filed Nov. 8, 1924
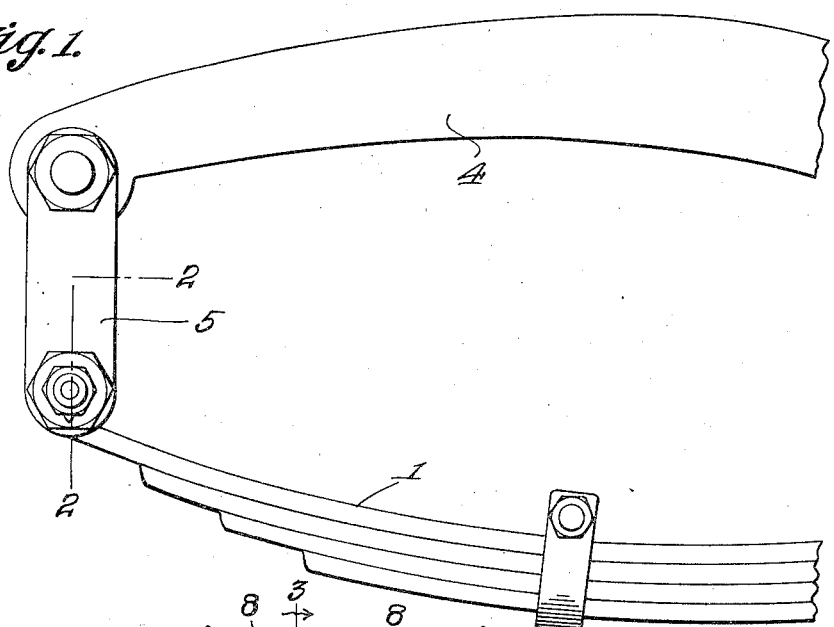
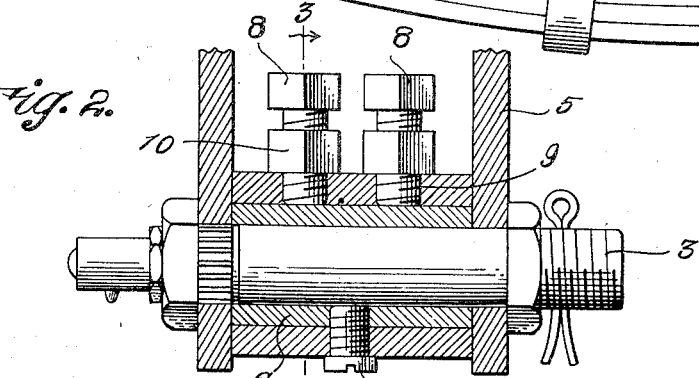
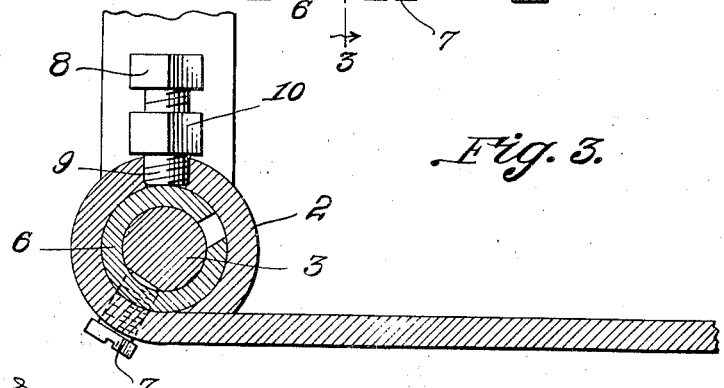
Edward Kelley
INVENTOR
BY Victor J. Evans
ATTORNEY Patented Apr. 28, 1925.

1,536,018

UNITED STATES PATENT OFFICE.

EDWARD KELLEY, OF ALTOONA, PENNSYLVANIA.

ADJUSTABLE BUSHING.

Application filed November 8, 1924. Serial No. 748,685.

*To all whom it may concern:*

Be it known that I, EDWARD KELLEY, a citizen of the United States, residing at Altoona, in the county of Blair and State of Pennsylvania, have invented new and useful Improvements in Adjustable Bushings, of which the following is a specification.

My present invention pertains to adjustable bushings and it has for one of its objects to provide an adjustable bushing adapted to be used to advantage in apparatus of various kinds where it is desirous to avert loose play or lost motion, and take up wear.

Another object is the provision of a spring connection for use in automobiles and embodying an adjustable bushing for the purposes indicated.

To the attainment of the foregoing, the invention consists in the improvement as hereinafter described and definitely claimed.

In the accompanying drawings, forming part of this specification:—

Figure 1 is a side elevation showing by way of example spring connection embodying my invention.

Figure 2 is an enlarged detail section of the connection, taken in the plane indicated by the line 2—2 of Figure 1.

Figure 3 is a section taken on the line 3—3 of Figure 2.

Similar numerals of reference designate corresponding parts in all of the views of the drawings.

The spring 1 terminates at its end in a bent eye 2 for the reception of a shackle bolt 3, and is designed to be hung from a supporting element 4 through the medium of links 5.

In accordance with my invention a case-hardened steel split bushing 6 is positioned in the eye 2 and about the shackle bolt 3. Also in accordance with my invention a pin, screw or other appropriate element designated by 7 is carried by the eye 2 and engaged with the bushing 6 to prevent turning of the bushing in the eye 2. The screw 7 does not engage or interfere with turning of the shackle bolt 3. Manifestly it is within the purview of my invention to employ any appropriate means for the purpose ascribed to the screw 7, and I therefore do not desire to be understood as confining myself to a screw, pin or other means to perform the function indicated.

In addition to the elements referred to my improvement includes one or more, preferably two, adjusting bolts 8, said bolts bearing in threaded apertures 9 in the eye 2 and against the bushing 6 and being equipped with lock nuts 10.

In virtue of the construction of my novel connection it will be readily apparent that any wear on the bushing due to use can be taken up by adjusting the bolt or bolts 8, and with the expenditure of little time and labor and without the employment of a skilled mechanic. It will also be understood that the bushing of case-hardened steel will in all likelihood last as long as an automobile and can always be utilized to eliminate rattle and other noise due to wear.

Manifestly any appropriate number of the bolts 8 may be employed according to the size of the connection; and it will also be noted that the connection is inexpensive in construction and susceptible of ready installation and is well adapted to withstand the usage to which all automobile parts are ordinarily subjected.

I have entered into a detailed description of the construction and relative arrangement of the parts embraced in the illustrated embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

In an adjustable bushing construction, the combination of an eye, a bolt extending through said eye, a split bushing of case-hardened steel arranged in the eye and about the bolt, means for preventing turning of the bushing in the eye, and an adjusting bolt threaded in the eye and engaging the bushing.

In testimony whereof I affix my signature.

EDWARD KELLEY.